(12) United States Patent
Chang et al.

(10) Patent No.: US 8,750,815 B2
(45) Date of Patent: Jun. 10, 2014

(54) COMMUNICATION DEVICE AND CONTROL METHOD THEREOF

(75) Inventors: Yu-Tai Chang, Hsinchu Hsien (TW); Chih Yu Chen, Hsinchu Hsien (TW); Chia Sheng Peng, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 140 days.

(21) Appl. No.: 13/096,546

(22) Filed: Apr. 28, 2011

(65) Prior Publication Data

US 2012/0021711 A1 Jan. 26, 2012

(30) Foreign Application Priority Data

Jul. 26, 2010 (TW) ................................ 99124576 A

(51) Int. Cl.
*H04B 17/00* (2006.01)
(52) U.S. Cl.
USPC .............. 455/226.3; 455/343.2; 455/343.3; 455/226.1; 455/574; 455/127.5; 370/311

(58) Field of Classification Search
USPC ............... 455/343.2–343.5, 574, 127.5, 458, 455/226.3, 226.1; 370/311
See application file for complete search history.

(56) References Cited

U.S. PATENT DOCUMENTS

| | | | | |
|---|---|---|---|---|
| 5,930,706 | A * | 7/1999 | Raith .......................... | 455/422.1 |
| 8,073,471 | B1 * | 12/2011 | Spencer ...................... | 455/458 |
| 2003/0058820 | A1 * | 3/2003 | Spencer et al. ............... | 370/332 |
| 2009/0075679 | A1 * | 3/2009 | Lin et al. ...................... | 455/458 |

* cited by examiner

*Primary Examiner* — Junpeng Chen
(74) *Attorney, Agent, or Firm* — Edell, Shapiro & Finnan, LLC

(57) ABSTRACT

A communication device including a receiving unit and a decision-making unit is provided. The receiving unit receives a first burst in a paging message provided from a base station. After comparing a signal-to-noise ratio to a threshold, the decision-making unit decides, based on the comparison result, the judging mechanism for judging whether the paging message is a dummy paging message. The signal-to-noise ratio is associated with the channel via which the first burst passed.

22 Claims, 9 Drawing Sheets

| First byte | Identification code length | | |
|---|---|---|---|
| Second byte | Identification code byte 1 | Even/ Odd | Identification code type |
| Third byte | Identification code byte (P+1) | Identification code byte P | |
| Fourth byte | 00101011 | | |
| ⋮ | ⋮ | | |

Figure 4

| Index of bytes | Dummy page message content | |
|---|---|---|
| | Decimal | Binary |
| 0 | 15 | 0001 0101 |
| 1 | 06 | 0000 0110 |
| 2 | 21 | 0010 0001 |
| 3 | 0'M' | 0000 0000 |
| | | 0000 0001 |
| | | 0000 0010 |
| | | 0000 0011 |
| 4 | 01 | 0000 0001 |
| 5 | 'F'0 | 0000 0000 |
| | | 1111 0000 |
| 6 | 2b | 0010 1011 |
| ⋮ | ⋮ | ⋮ |
| 22 | 2b | 0010 1011 |

Figure 6

COMMUNICATION DEVICE AND CONTROL METHOD THEREOF

CROSS REFERENCE TO RELATED PATENT APPLICATION

This patent application is based on Taiwan, R.O.C. patent application No. 099124576 filed on Jul. 26, 2010.

FIELD OF THE INVENTION

The present invention relates to communication systems, and more particularly, to a communication device and control method thereof for detecting dummy paging messages.

BACKGROUND OF THE INVENTION

In present wireless communication systems, such as a GSM communication system, base stations transmit a Calling Identity Delivery (CID) message to mobile devices in the coverage cells via paging messages. Where no incoming call is placed, the base station nevertheless periodically transmits a dummy paging message without substantial content (i.e., the CID message), so that synchronization between the base station and the mobile device can be maintained. In practice, the base station transmits dummy paging messages most of the time.

FIG. 1 is a partial schematic function block diagram of a transmitting end/receiving end in a communication system. The transmitting end 10 may be a transmitting device of the base station, and the receiving end may be a receiving device of the mobile communication device. In a GSM communication system, the original message codes of the substantial paging message and the dummy paging message include 228 bit data, where 40 bits of the 228 bits are redundancy codes for error detection at the receiving end 20. After a ½ code rate convolution coding procedure provided by the encoder 12, the original message codes are transformed into 456-bit coded data. The interleaver 14 is responsible for dispersing the coded data into four bursts, each of which includes 114 bits data. Then, the four bursts may be processed by the mapping unit 16 and the modulating unit 18 to be transmitted in the form of a RF signal in sequence.

The RF receiver 21 of the receiving end 20 may receive the RF signals corresponding to the four bursts in sequence. After demodulation by the demodulator unit 22, elimination by the impulse response procedure of the channel equalizer 23, rearrangement by the deinterleaver 24 and decoding by the decoder 25, these RF signals are converted back into 228 bits of restored message code. Then, the subsequent circuit is responsible for determining whether the restored message code represents a substantial paging message or a dummy paging message and perform appropriate subsequent processing accordingly.

Theoretically, the receiving end 20 only determines the type of the paging message after it has received all four bursts and rearranges them to form the restoring message code. However, if the paging message is a dummy paging message, all four bursts do not contain substantial messages, such as calling information. As a result, it is not power-efficient to receive many dummy messages for the mobile devices.

In the present field of art, there have been developments of technologies that determine whether the paging message is a substantial paging message only according to a first burst of the four bursts. When it is determined that the paging message is a dummy paging message according to the determination result, the receiver of the communication apparatus stops receiving the signals related to the follow three bursts, thereby reducing the power consumption. However, in a situation of serious noise interference, misjudgment may occur when determination of whether the paging message is a substantial paging message is made only according to the first burst. As a result, substantial paging messages including important information may be lost.

SUMMARY OF THE INVENTION

A communication device and control method thereof are provided for resolving the problem identified above by taking into consideration the signal-to-noise ratio (SNR) of the circumstance in which the communication device is located. If the SNR indicates that the present communication circumstance is very desirable, the communication device may adopt a judgment mechanism in which judging whether the paging message is a dummy paging message is performed according to the first burst, thereby, achieving the power saving effect. On the contrary, if the SNR indicates that the present communication situation is below a threshold, the communication system may adopt a judgment mechanism in which judging whether the paging message is a dummy paging message is performed according to more bursts, thereby reducing the ratio of misjudging.

In addition, the mobile identification number (MIN) of the communication device also can be taken into consideration in the communication device and control method thereof. The MIN may be classified into a blacklist group, if the MIN is similar to the dummy paging message in content. In other words, the blacklist group includes MINs that are sensitive to noise, such that they can be misjudged to be a part of the dummy paging message once subjected to noise interference. If the MIN of a communication device belongs to the blacklist group, the communication device may be designed as judging whether the paging message is a dummy paging message according to more bursts in the situation where the SNR is lower, for improving the judging precision.

According to one embodiment described herein, a communication device including a receiving unit and a decision-making unit is provided. The receiving unit is used for receiving a first burst in a paging message provided by a base station. The decision-making unit is used for comparing a signal-to-noise ratio with a threshold, and generating a comparison result, then deciding a judging mechanism according to the comparison result, for judging whether the paging message is a dummy paging message. The signal-to-noise ratio is associated with the channel via which the first burst passed.

According to another embodiment of the present disclosure, a control method applied to a communication device is provided. The control method comprises: receiving a first burst in a paging message; then, comparing a signal-to-noise ratio with a first threshold for generating a comparison result, and deciding a judging mechanism according to the comparison result, for judging whether the paging message is a dummy paging message.

The advantages and spirit related to the present invention can be further understood via the following detailed description and drawings.

Following description and figures are disclosed to gain a better understanding of the advantages of the present invention.

BRIEF DESCRIPTION OF THE DRAWINGS

FIG. 4 shows the partial format of the essential paging message in a GSM system.

FIG. 6 shows data information of the dummy paging message in a GSM system.

DETAILED DESCRIPTION OF THE PREFERRED EMBODIMENT

Figure 1:
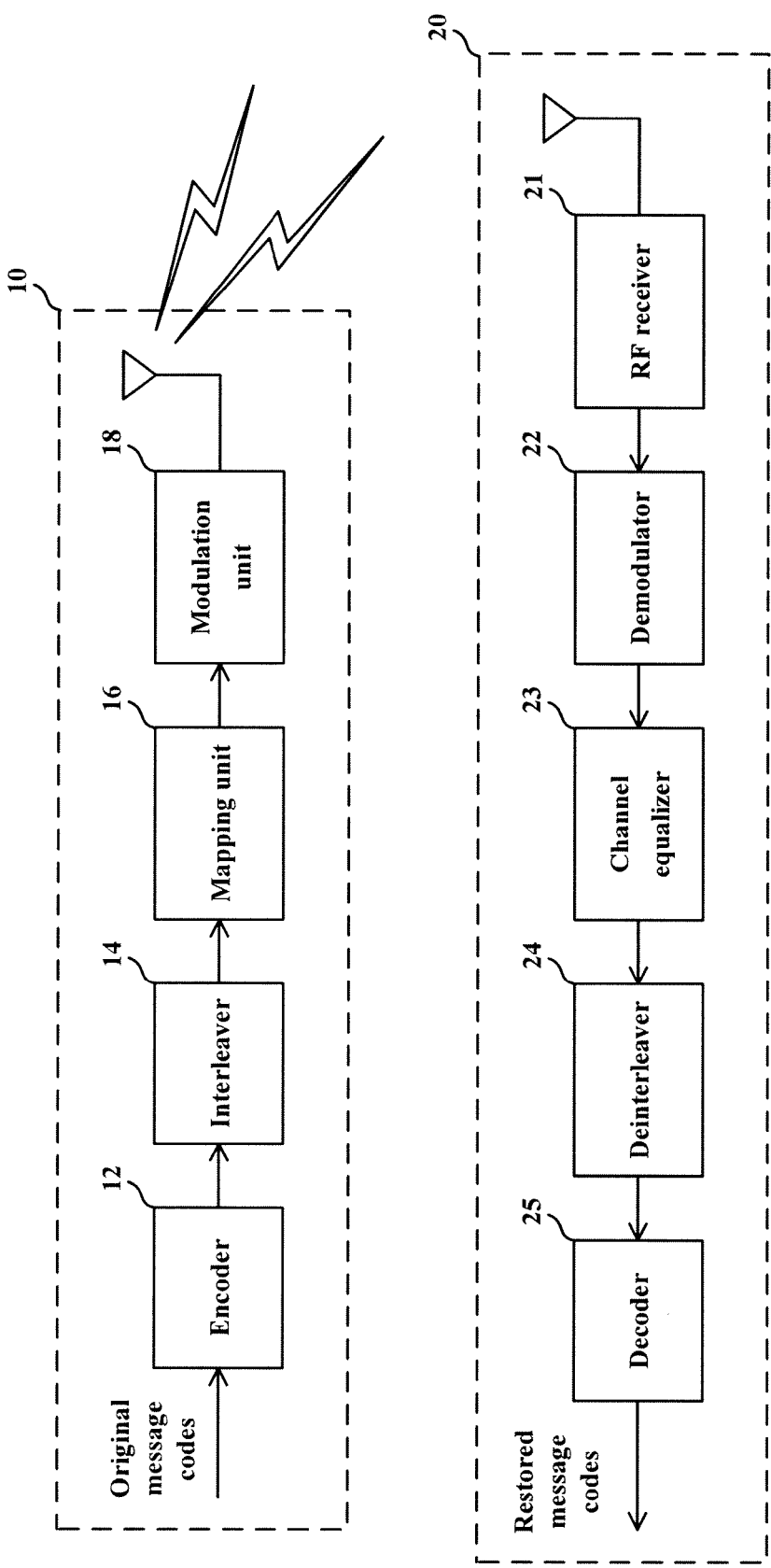
FIG. 1 is a function block diagram of a sending end/receiving end in a communication system.
Figure 2:
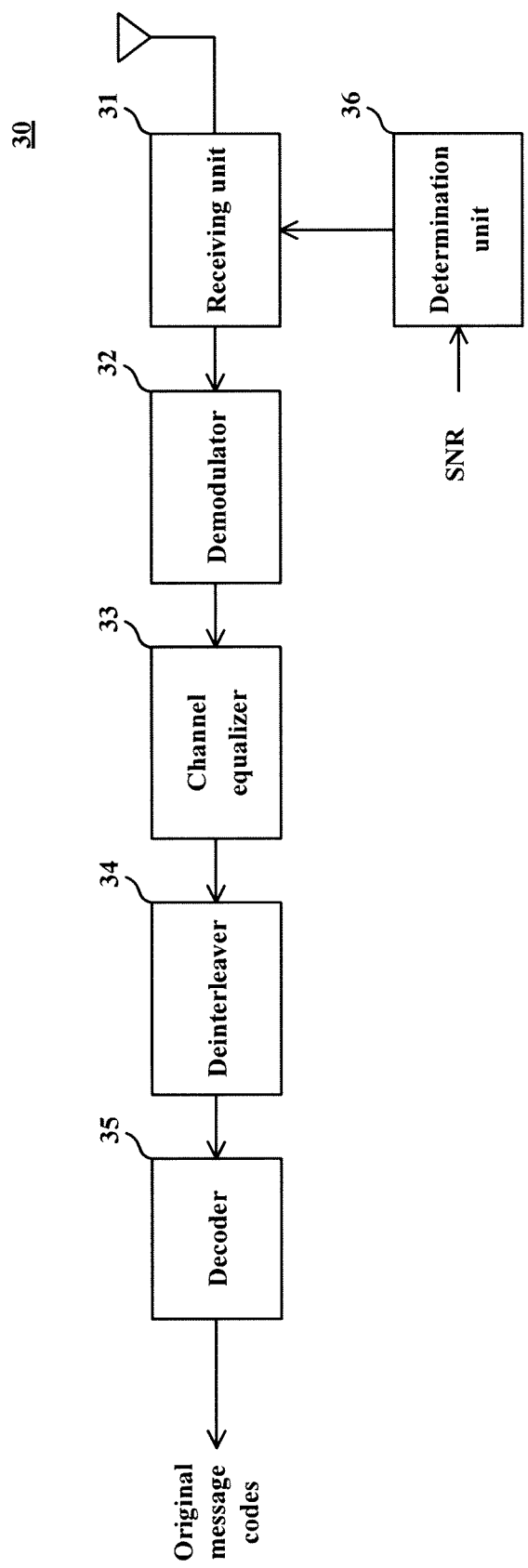
FIG. 2 is a function block diagram of a communication device according to a first described embodiment of the present disclosure.

FIG. 2 is a function block diagram of the communication device according to a first embodiment of the present disclosure. The communication device is adapted to a communication system which includes at least one base station. The communication device 30 of the present disclosure comprises a receiving unit 31, a demodulation unit 32, a channel equalizer 33, a deinterleaver 34, a decoder 35 and a decision-making unit 36. Decision-making unit 36 may be integrated into the communication device 30, or may be independent of the communication device 30.

The communication device 30 herein may represent the communication IC integrated in the mobile phone or represent the mobile phone itself; the receiving unit 31 may include a RF module and Analog to Digital Converter (ADC) components, etc.

At different times as well as different environments, the signal-to-noise ratio (SNR) for the communication device 30 may be different. In other words, the SNR closely associates with the channel that the paging message travels through. The communication device 30 may estimate the SNR according to the wireless signal received by the receiving unit 32 as a reference value for device configuration. In practice, the communication device 30 may estimate the SNR periodically, or it may estimate the SNR once receiving the wireless signal. The higher the SNR is, the less interference is made to the signals, which means the receiving unit 31 receives more correct signals.

As described above, the base station may transmit a paging message to notify the mobile device of CID under its coverage, while the base station transmits dummy paging messages most of the time. In an embodiment, two determination mechanisms are possible for the communication device 30 to determine whether a received message is a dummy message. One of the determination mechanisms is dependent on only one burst in the paging message; the other mechanism is dependent on at least two bursts in the paging message. The decision-making unit 36 is utilized for comparing the present signal-to-noise ratio (SNR) with a first threshold to generate a comparison result, then deciding a determination mechanism according to the comparison result, for determining whether the paging message is a dummy paging message. In the embodiment, if the SNR is higher than the first threshold, the decision-making unit 36 indicates to the communication device 30 to determine whether the paging message is dummy paging message only according to the first burst in the paging message. Once the determination result based on the first burst indicates that the paging message is a dummy paging message, the receiving unit 31 stops receiving the signal associated with the following three bursts in the paging message.

On the other hand, when the SNR is lower than the first threshold, the decision-making unit 36 indicates to the communication device 30 to determine whether the paging message is dummy based on at least two bursts in the paging message. Specifically, in the situation in which the SNR is lower than the first threshold, the communication device 30 receives at least two bursts in the paging message to determine whether the paging message is a dummy message. As a result, in the situation of serious noise interference, the possibility of misjudgment of the substantial paging message and dummy paging message is reduced.

From the description above, it is known that determination of dummy paging messages of the communication device 30 in the embodiment is not always only based on the first burst. In reference to the SNR, the communication device 30 adaptively reaches a balance between power saving and the need for correct judgment. In practice, the first threshold can be decided from experimental or simulation results, as well as be designed to be adjustable. It is noted that the decision-making unit 36 is mainly designed for deciding the suitable determination mechanism for the communication device 30. The communication device 30 may include other circuits not shown in FIG. 2 to perform the procedure of that mechanism chosen according to one or more bursts.

Figure 3A:
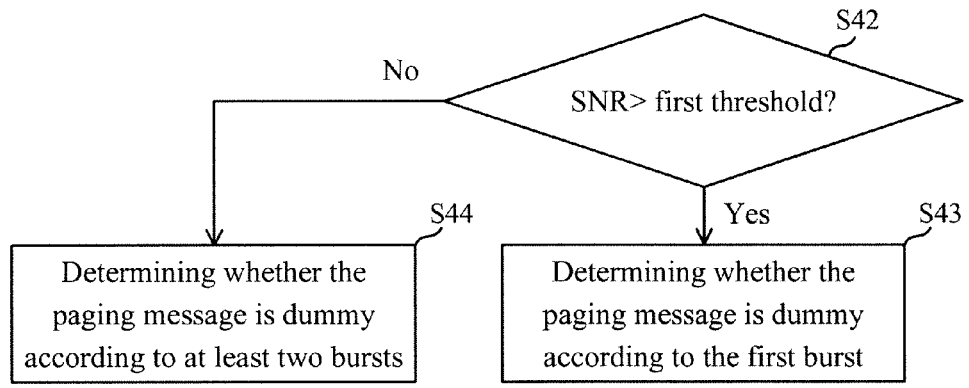
FIG. 3(A)-FIG. 3(D) are flow charts of a judging procedure of the decision-making unit.

FIG. 3(A) is an operation flow chart of a process of decision making of the decision-making unit 36. Step S42 includes comparing the SNR with the first threshold for determining whether the SNR is higher than the first threshold. If the comparison result is positive, step 43 is performed. If the comparison result is negative, then step 44 is performed. In step 43, the communication device 30 adopts the determination mechanism which determines whether the paging message is a dummy paging message only according to the first burst of the paging message. In step 44, the communication device 30 adopts the determination mechanism that determines whether the paging message is a dummy paging message based on at least two bursts in the paging message.

According to the present embodiment, in addition to SNR, the decision-making unit 36 may also choose the mechanism for the communication devices with certain mobile identification codes. That is, selected communication devices under a given cell may be controlled to apply a specified determination mechanism. The mobile identification codes are generally stored in the memory of the communication device 30, and these stored mobile identification codes change with different network areas as the communication device 30 moves. In the same network area, different communication devices have their own identification codes as the identities of the communication devices. When the base station sends a substantial paging message containing CID information or short message service (SMS) information to inform the communication device that there is an incoming call or text message, the substantial paging message will include the mobile identification code of the communication device 30. In practice, a substantial paging message may include identification codes of different communication devices.

Taking the GSM system as an example, the number of bits contained in the dummy paging message and in the substantial paging message are equal. The main difference of the two messages is whether the message contains the substantial information, such as the mobile identification codes of one or more communication devices. In the substantial paging messages, columns are filled with substantial information in binary format. In the dummy paging message, the columns without substantial information are repeatedly filled with the same binary content, such as 00101011 (expressing 2B in hexadecimal mode). This binary content is defined in the GSM standard for representing dummy paging message. Via a restoration process after receiving a part of the paging message, the communication device 30 may determine whether the paging message is a dummy paging message by checking whether certain specific columns, such as the paging request type column, the page mode column, or/and other columns, are filled with content such as 00101011.

FIG. 4 shows a part of the format of the substantial paging message in the GSM system. The first byte represents the length of the identification code, which is 3; the second and third bytes are used for representing the mobile identification code; beginning from the forth bytes, the columns may be filled 00101011, except for the columns that contains substantial information. Such a paging message (184 bits) is transmitted by the base station after convolution and interleaving as four 114-bit burst codes. It shows that the less the mobile identification code information the substantial paging message contains, the more similar the content of the substantial paging is to the dummy paging message. In addition, the most similar condition presents when the substantial paging message has only one set of mobile identification code and the mobile identification code stored in the third byte has only one bit difference with the filling code 00101011 (for example, the content of the third byte is 00101010 or 01101011). In such case, when the encoded bursts transmitted from the base station travel through the channel, the channel interference may cause the one bit difference in the original bursts to disappear. Therefore, the communication device 30 is likely to misjudge the substantial paging message as a dummy paging message.

As to a communication device which has mobile identification code with its third byte being substantially different from the code 00101011, even it receives paging messages via the channel with significant interference which may cause the device to misjudge the paging message, it is irrelevant to this communication device because the paging messages it missed are the ones for other communication devices. However, as mentioned above, if the third byte of the mobile identification code of certain communication device has slight difference with the code 00101011, the misjudgment will result in missing important message. Therefore, the two communication devices which have different mobile identification codes may be designed to adopt different determination criteria.

According to an embodiment of the present disclosure, a blacklist group is set up and stored in the communication device 30 beforehand. The blacklist group contains the mobile identification code which is sensitive to the noise, that is, it may be misjudged as a part of bit content of the dummy paging message if the mobile identification code suffers from noise interference. If the mobile identification code of the communication device 30 belongs to the blacklist group, the communication device 30 may adopt the determination mechanism that is based on multi-bursts under the situation of low SNR, for reducing the misjudging chances.

The blacklist group can be set up according to the possible content of the dummy paging message, and it can be decided or established by simulations or experiments. As shown in FIG. 4, the "identification code byte 1" containing four bits has 17 possible variations. In the second byte column, the content of "identification code type" has four possibilities, i.e. 001, 010, 100, 011, and the content of the parity bit has two possibilities which are 0 and 1. For the third byte column, there are 8 variations that the content of this column has only one bit difference with code 00101011. It can be concluded that there are 544 mobile identification codes resulting from all of the combinations of the possible variations. For example, in an embodiment, the designer may simulate a plurality of channel conditions, and select 30 mobile identification codes with the highest misjudging rate among the 544 mobile identification codes, as the blacklist group. The blacklist group may be stored in the memory of the communication device 30 as default. In other embodiments, the blacklist group may contain all of the 544 mobile identification codes.

Figure 3B:
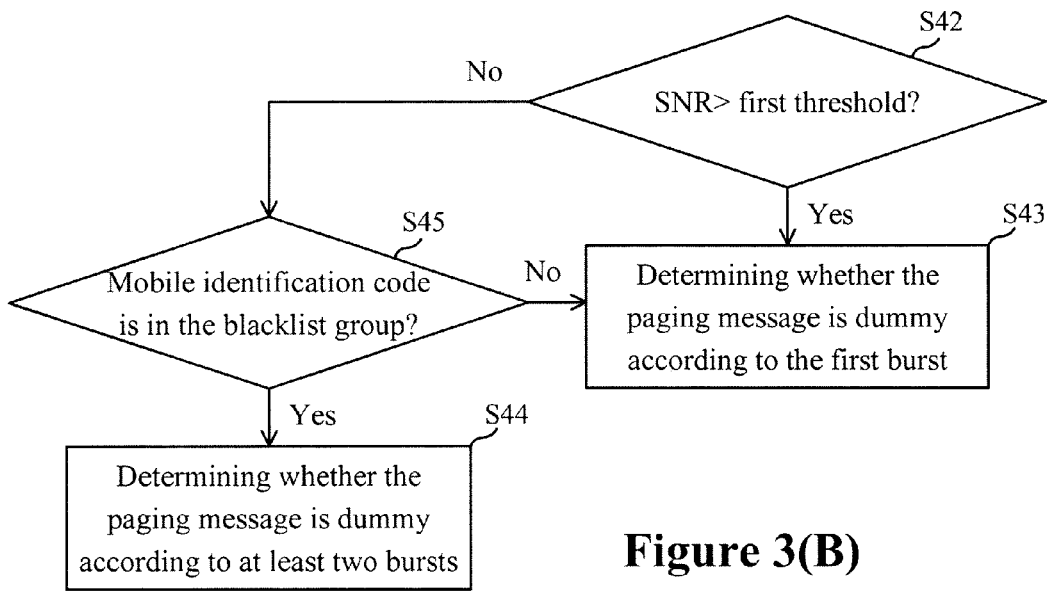

FIG. 3(B) is a flow chart of another determination procedure that the decision-making unit 36 adopts in another embodiment of the present invention, where the SNR and the mobile identification code are taken as reference factors. Similarly to the embodiment as depicted in FIG. 3(A), if the determination result from the step S42 is positive, then step S43 is performed, in which the communication device 30 adopts the determination mechanism that determines whether the paging message is a dummy message according to the first burst of the paging message. If the determination result in step 42 is negative, the decision-making unit 36 reads the present mobile identification code from the memory of the communication device 30, then step S45 is performed. Step 45 includes determining whether the mobile identification code belongs to the blacklist group. If the determination result from the step S45 is negative, it indicates that the communication device 30 may adopt a less strict determination mechanism that performs the same mechanism as in the step S43, i.e., judging whether the paging message is dummy according to the first burst of the paging message. If the determination result from the step S45 is positive, it indicates that the communication device 30 adopts a more strict mechanism, for example in step S44, i.e., determining whether the paging message is a dummy message according to at least two bursts.

Figure 3C:
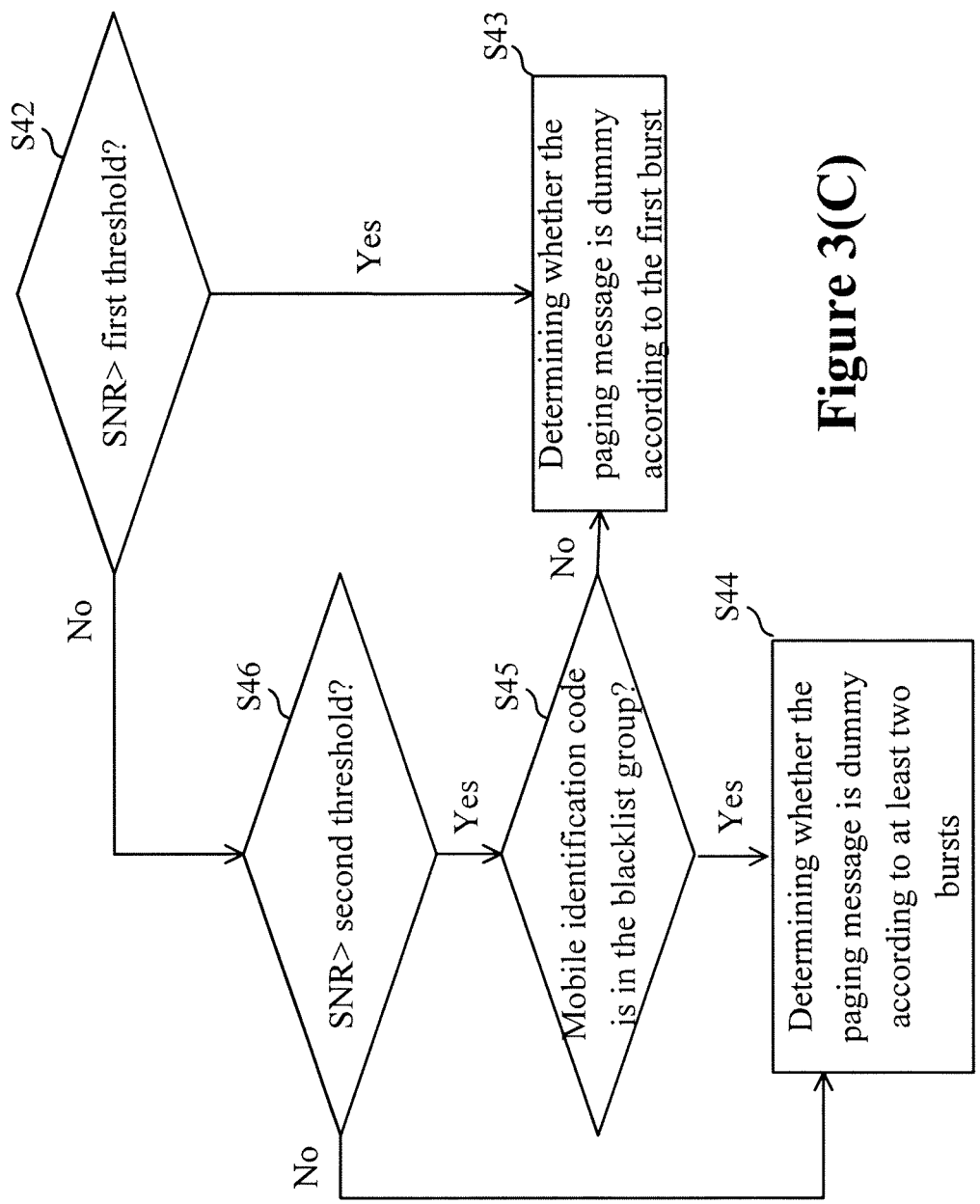

In practice, the decision-making unit 36 may take two different thresholds as the determination criteria. FIG. 3(C) shows a flow chart of another determination procedure that the decision-making unit 36 adopts in another embodiment, where two SNR thresholds are taken as reference. The second threshold is lower than the first threshold, and may be equal to a value of subtracting a specific value from the first threshold in practice, for example, the second threshold may be equal to 80 percent of the first threshold. If the result from step S42 is negative, the decision-making unit 36 performs step 46 in the embodiment, i.e., determining whether the SNR under the present environment that the communication device 30 locates is higher than the second threshold. If the result from step S46 is negative, it indicates that the present SNR is low, so that it is necessary that the communication device 30 adopt the determination mechanism that determines whether the paging message is a dummy message according to at least two bursts to all paging message. On the contrary, if the determination result from step S46 is yes, it indicates that the present SNR is between the second threshold and the first threshold, as shown in the step S45, the decision-making unit 36 will check whether the mobile identification code of the communication device 30 is in the blacklist group, and thus a determination mechanism is decided as a result of the flow.

Figure 3D:
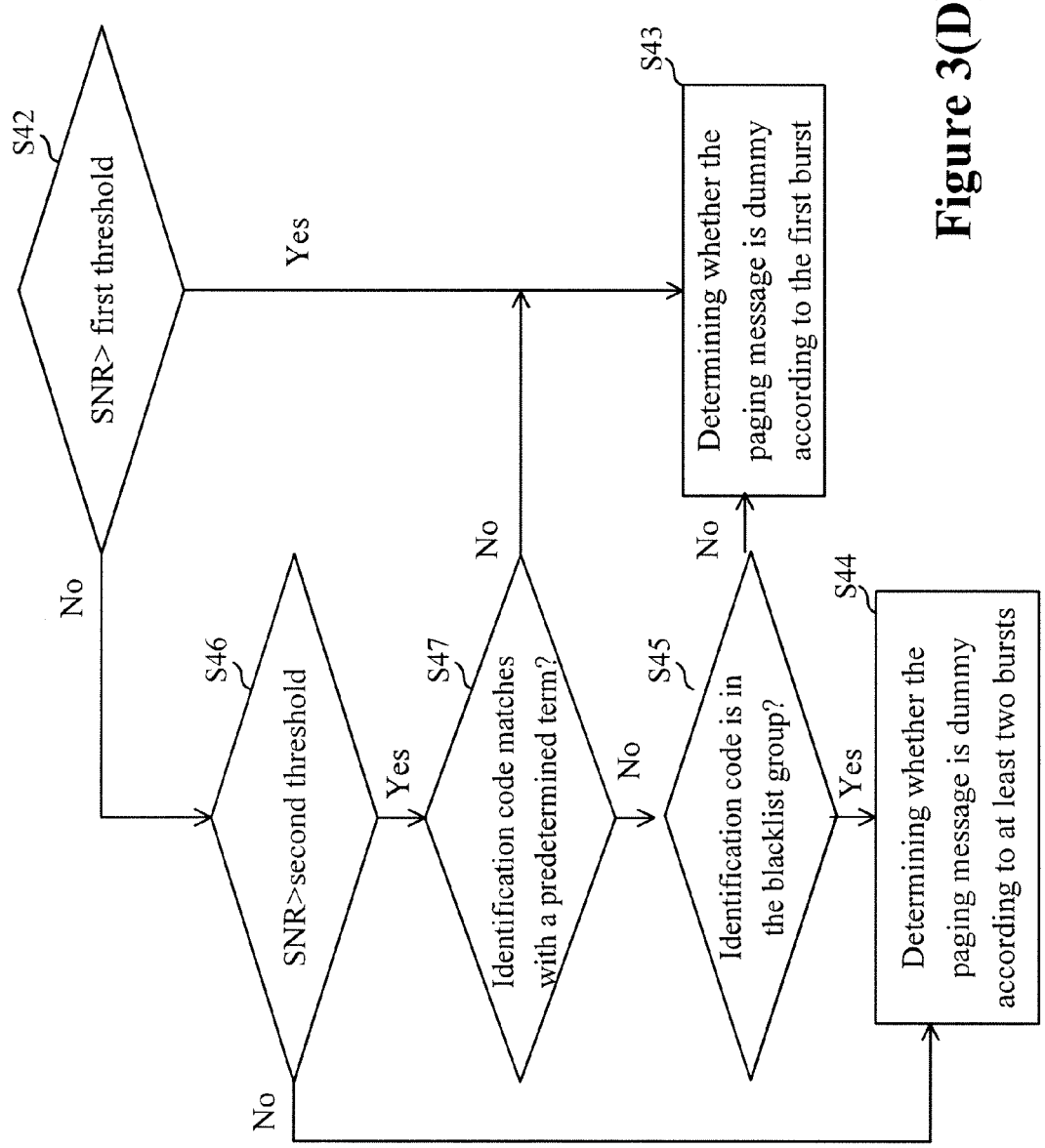

In FIG. 3(D) the flow chart further includes step S47, besides the steps described above. Step 47 is performed to determine if the mobile identification code conforms to a predetermined term. The predetermined term may be a difference between a part of the mobile identification code and a feature vector of the dummy paging message, where the difference is less than a default value. For example, the predetermined term is met when the bit length of the mobile identification code is three bits, and there is only one bit difference between the code 00101011 and the third byte of the mobile identification code shown in FIG. 4. If the judging result from step S47 is yes, it indicates that the mobile identification code is very similar to the content of the dummy paging message. In such circumstances, the decision-making unit 36 will continue to step S45 that decides the determination mechanism adopted by the communication device 30 according to whether the mobile identification code of the communication device 30 is in the blacklist group. In this embodiment, if the determination results from step S45 and step S47 are all positive, the communication device 30 will adopt the strict determination mechanism to determine whether the paging message is a dummy message according to at least two bursts.

In another embodiment, the decision-making unit may adopt another determination mechanism that only takes the mobile identification code of the mobile device as a reference. Similar to the determining steps in the previous embodiments, the decision-making unit in this embodiment controls the communication device to determine whether the paging message is a dummy message according to at least two bursts as long as the mobile identification code of the communication device is in the blacklist group. If the mobile identification code of the communication device is not in the blacklist group, the decision-making unit makes the communication device determine whether the paging message is a dummy paging message according to the first burst.

Figure 5:
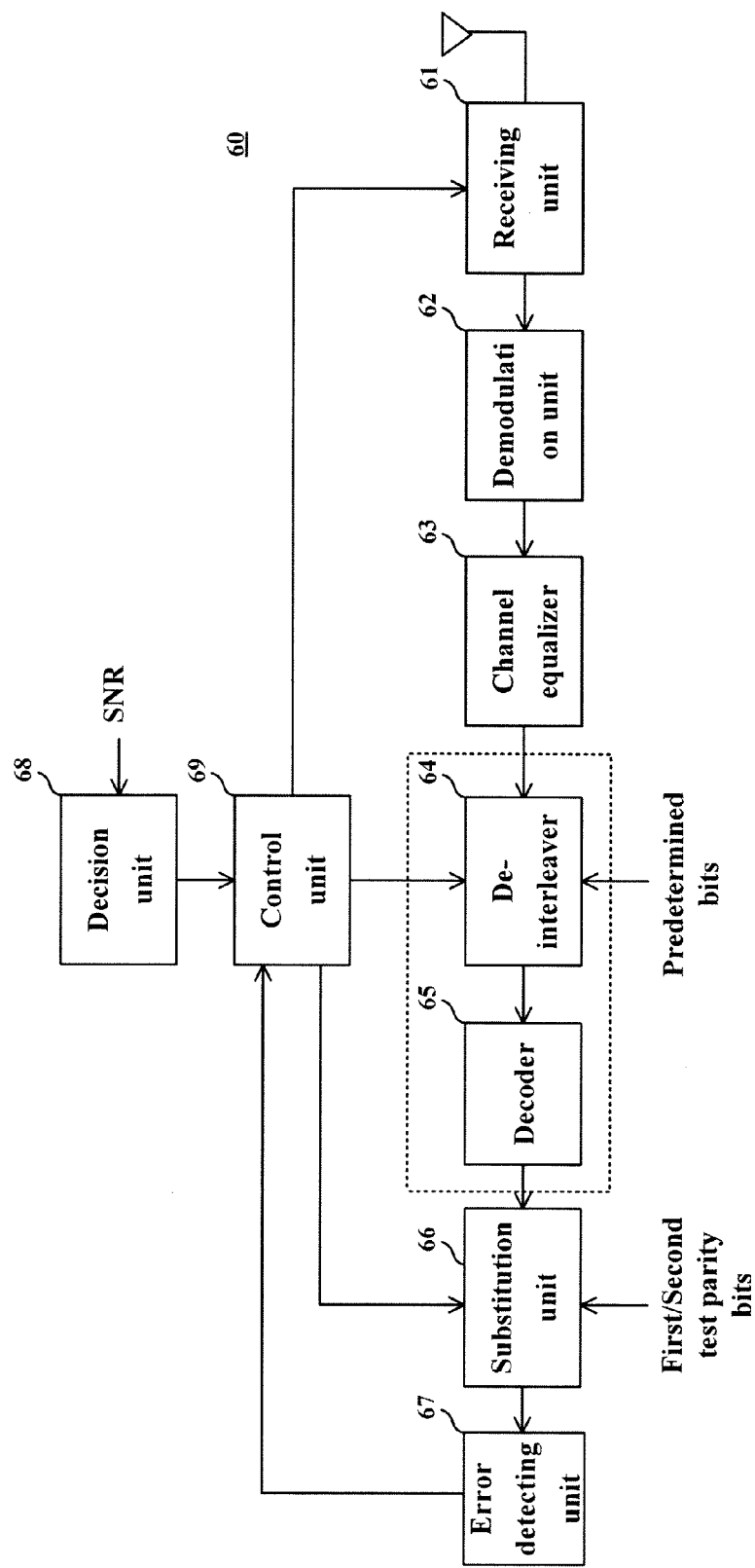
FIG. 5 is a block diagram of a communication device circuit according to another embodiment.

FIG. 5 shows a circuit block diagram of a mobile device, for illustrating how the communication device of the present disclosure determines whether the paging message is a dummy message according to the first burst. The mobile device 60 comprises a receiving unit 61, a demodulating unit 62, a channel equalizer 63, a data processing unit including a deinterleaver 64 and a decoder 65, a substitution unit 66, an error-detecting unit 67, a decision-making unit 68 and a control unit 69. The operation of the decision-making unit 68 is similar to the decision-making unit 36 in the previous embodiments, therefore the details of the decision-making unit 68 hereinafter will not be described again.

Firstly, the operations of how the decision-making unit 68 controls the communication device 60 to determine whether the paging message is a dummy message according to the first burst through the control unit 69 are illustrated. After the first burst of a paging message is received by the receiving unit 61, it may be processed by the demodulating unit 62 and the channel equalizer 63. Assume that the channel equalizer 63 outputs the signal B0 associated with the first burst. In this embodiment, the signal B0 and plurality of predetermined bits stored in the memory of the communication device 60 are combined into a combination message in the deinterleaver 64, and the deinterleaver 64 will deinterleave the combination message.

These predetermined bits correspond to at least one burst following the first burst in the dummy paging message. In the GSM system, for example, assuming that the outputs of the channel equalizer are [B1 B2 B3 B4] after the four bursts of a dummy paging message travel through the channel equalizer 63 in sequence, the [B2 B3 B4] can be taken as the predetermined bits, for combining with the signal B0 to form the combination message [B0 B2 B3 B4]. If it is positive that the signal B0 corresponds to a dummy paging message, the combination message [B0 B2 B3 B4] should be similar to the [B1 B2 B3 B4]; therefore, the result of combination message [B0 B2 B3 B4] after deinterleaving procedure, should be very similar to that of the [B1 B2 B3 B4].

FIG. 6 shows the data information of the dummy paging message in the GSM system. As shown in FIG. 6, in the column corresponding to the third byte, the M may be 0000, 0001, 0010, 0011, and in the column corresponding to the fifth byte, the F may be 0000 or 1111. Therefore, the dummy paging message may contain eight variations of data information. It is observed that the eight variations of data information have many identical bits. As to the second burst, among the 114 bits data information, 89 bits remain the same in the eight situations said above. In this case, B2 of the predetermined bits [B2 B3 B4] can be designed to include the 89 bits data information, where "0s" are filled as the rest 25 bits in the 114-bit data information.

Similarly, in the third burst and fourth burst of the dummy paging message, respectively, 87 bits and 90 bits are the same in the eight variations. Therefore, the B3 of the predetermined bits [B2 B3 B4] may be designed to include the 87 bits data information, and where "0s" are filled as the rest 27 bits; the B4 may be designed to include the 90 bits data information, where rest of the bits are 0s.

Then, the decoder 65 is responsible for decoding the 456 bits data which are already deinterleaved to generate a decoded message containing 228 bits of data.

As mentioned above, in the GSM system, the decoded message should include 40 bits of redundancy code for the communication device 60 to perform error-decoding. To ensure that error detection result is not erroneous because of the 0s that are filled in as mentioned before, the substitution unit 66 substitutes forty predetermined first test parity bits for the parity bits of the decoded message to generate a first substituted message. These forty first test parity bits associate with the condition that the F is 0000. Specifically, the set of first test parity bits correspond to the redundancy code signal output from the decoder 65 after a dummy paging message being processed by the decoder 65, where the type of dummy paging message is the one that F is binary '0000'. In addition, as to the situation that the F is 1111, the substitution unit 66 can substitute forty second test parity bits for the parity bits of the decoded message to generate a second substituted message.

The error-detecting unit 67 performs an error-detecting check, such as cyclic redundancy check, to the first substituted message. If the first burst received by the receiving unit 61 corresponds to the dummy paging message wherein F is 0000, the corresponding error rate detected by error-detecting unit 67 is lower than a predetermined threshold. Based on the first checking result, the error-detecting unit 67 may determine that the paging message of the first burst is a dummy paging message. If the first checking result indicates that the error rate is higher than the predetermined threshold, the error-detecting unit 67 may continue performing the error-detecting check to the second substituted message. If the first burst received by the receiving unit 61 corresponds to the dummy paging message wherein F is 1111, the error rate corresponding to the second substituted message is lower than the preset threshold.

If the error rate corresponding to the first substituted message and the error rate corresponding to the second substituted are all higher than the predetermined threshold, the error-detecting unit 67 may determine that the paging message of the first burst is not a dummy paging message. In this situation, the control unit 69 may request the receiving unit 61 to continue receiving the following bursts of the paging message. When processing the next three bursts, the control unit 69 may control the deinterleaver 64 to stop the combining procedure, and control the substitution unit 66 to stop the substituting procedure.

On the other hand, in the situation that the decision-making unit 68 makes the communication device 60 to determine whether the paging message is a dummy message through the control unit 69 based on plural bursts, the control unit 69 may also control the deinterleaver 64 to stop the combining procedure, and control the substitution unit 66 to stop the substituting procedure.

In practice, as the number of the bits of the predetermined bits [B2 B3 B4] is higher than that of the B0 of the first burst, the predetermined bits [B2 B3 B4] are generated from multiplication of a plurality of initial predetermined bits by an equalization gain, so that the predetermined bits [B2 B3 B4] do not dominate the error-detecting result of the error-detecting unit 67. For example, assuming that after channel equalizer 63, the B0 is a quantization value whose range is in between ±128, the initial predetermined bits in binary format may be multiplied by the equalization gain whose range is ±10, which allows the quantization value of each bit in the [B2 B3 B4] to be distributed in the range of ±10.

Figure 7:
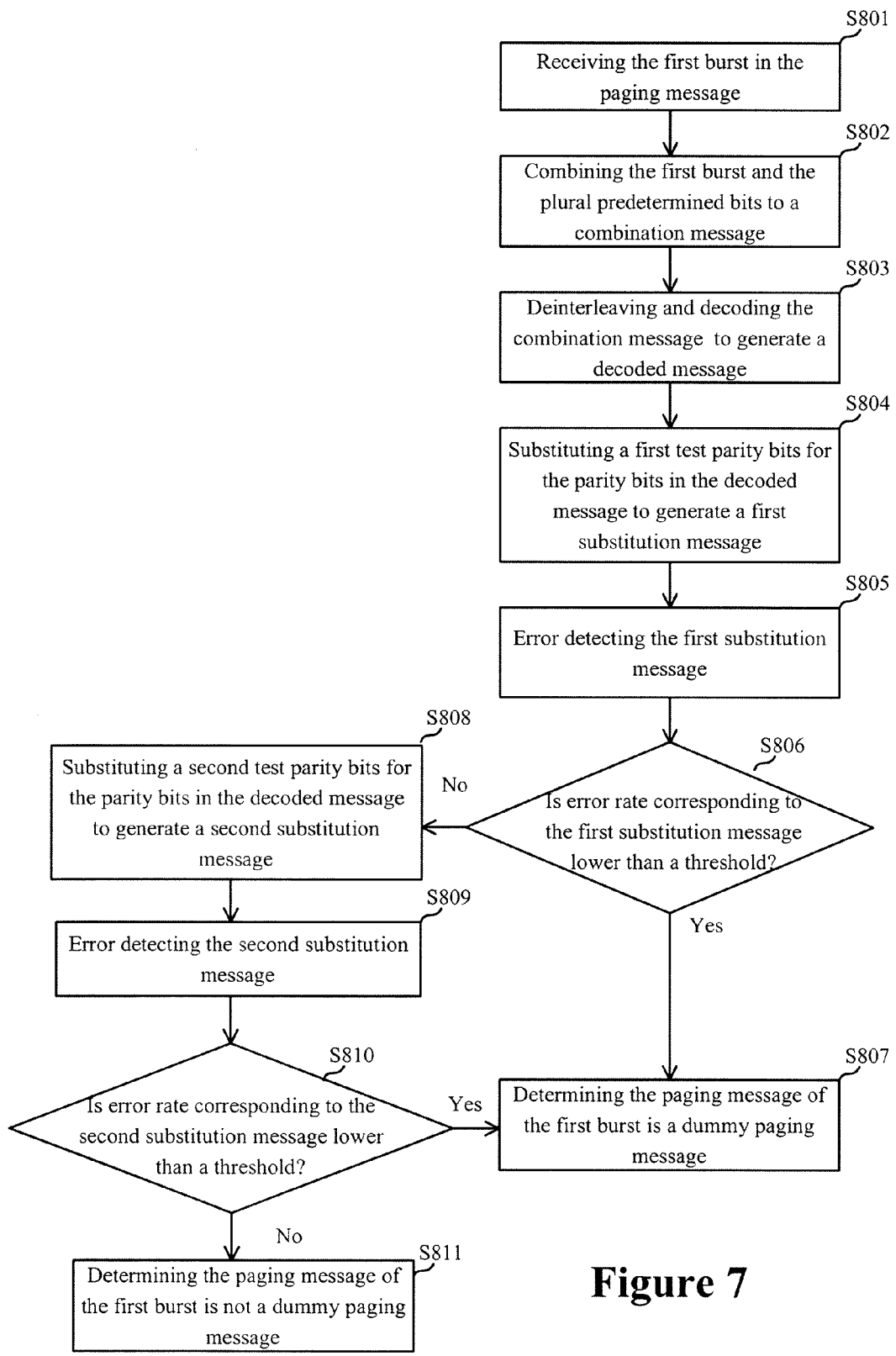
FIG. 7 is a follow chart of a communication device control method according to an embodiment.

FIG. 7 shows a flow chart of a communication device control method illustrating how the communication device determines whether the paging message is a dummy message according to the first burst. Step S801 includes receiving the first burst of a paging message. Step S802 includes combining the first burst and a plurality of predetermined bits into a combination message. Then, in step S803, the combination message is deinterleaved and decoded. Step S804 includes substituting a plurality of first test parity bits for a plurality of parity bits of the decoded message, for generating a first substituted message. In step S805, the error-detecting check is performed to the first substituted message.

In step S806, it is determined if the error rate corresponding to the first substituted message is lower than a threshold. If the result from step S806 is yes, the process continues to step S807 which determines that the paging message of the first burst is a dummy paging message. If the result from step S806 is no, the process moves to step S808 which substitutes a plurality of second test parity bits for the plurality of parity bits, for generating a second substituted message. Then, in step S809, the error-detecting check is performed to the second substituted message. Step S810 includes determining if the error rate corresponding to the second substituted message is lower than the threshold. If the result from step S810 is yes, the process continues to step S807. If the result from step S810 is no, step S811 is performed to determine that the paging message of the first burst is not a dummy paging message.

As described above, embodiments of the present invention leverage the environment signal-to-noise ratio (SNR) and/or the mobile identification code of the communication devices as determination factors for deciding whether to adopt a determination mechanism which consumes less power, or a determination mechanism which is more accurate, so that management of device power consumption and needs for reduction of error rate is balanced. The concept of the present disclosure may be widely used in various kinds of communication systems, in which there exists dummy paging messages.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A communication device, adapted to a communication system, the communication device comprising:

a receiving unit, for receiving a first burst in a paging message; and a decision-making unit, for comparing a signal-to-noise ratio with a first threshold to generate a comparison result, and deciding a determination mechanism according to the comparison result, for determining whether the paging message is a dummy paging message, wherein the signal-to-noise ratio relates to a channel that the first burst travels through and wherein the deciding is achieved without reference to another paging message, wherein when the signal-to-noise ratio is lower than the first threshold, the decision-making unit further determines whether the signal-to-noise-ratio is higher than a second threshold.

2. The communication device as claimed in claim 1, wherein, when the signal-to-noise ratio is higher than the first threshold, the determination mechanism determines whether the paging message is the dummy paging message according to the first burst.

3. The communication device as claimed in claim 1, wherein, when the signal-to-noise ratio is lower than the first threshold, the determination mechanism determines whether the paging message is the dummy paging message according to at least two bursts in the paging message.

4. The communication device as claimed in claim 1, wherein, when the signal-to-noise ratio is lower than the first threshold, the decision-making unit decides the determination mechanism according to a mobile identification code of the communication device.

5. The communication device as claimed in claim 4, wherein, the decision-making unit determines whether the mobile identification code is in a blacklist group.

6. The communication device as claimed in claim 5, wherein when the mobile identification code is not in the blacklist group, the determination mechanism determines whether the paging message is the dummy paging message according to the first burst.

7. The communication device as claimed in claim 5, wherein when the mobile identification code is in the blacklist group, the determination mechanism determines whether the paging message is the dummy paging message according to at least two bursts of the paging message.

8. The communication device as claimed in claim 1, wherein when the signal-to-noise ratio is lower than the second threshold, the determination mechanism determines whether the paging message is the dummy paging message according to at least two bursts of the paging message, and wherein the second threshold is lower than the first threshold.

9. The communication device as claimed in claim 1, wherein when the signal-to-noise ratio is in between the first threshold and the second threshold, the decision-making unit further determines whether the mobile identification code is in a blacklist group.

10. The communication device as claimed in claim 9, wherein when the mobile identification code is not in the blacklist group, the decision-making unit determines whether the paging message is the dummy paging message according to the first burst in the paging message.

11. The communication device as claimed in claim 9, wherein when the mobile identification code is in the blacklist group, the determination mechanism determines whether the paging message is the dummy paging message according to at least two bursts in the paging message.

12. The communication device as claimed in claim 1, wherein when the signal-to-noise ratio is higher than the second threshold, the determination mechanism determines whether the mobile identification code conforms to a predetermined term.

13. The communication device as claimed in claim 12, wherein the mobile identification code conforms with the predetermined term when a difference between a part of the mobile identification code and a feature vector of the dummy paging message is less than a default value.

14. The communication device as claimed in claim 12, wherein, when the mobile identification code does not conform to the predetermined term, the determination mechanism determines whether the paging message is the dummy paging message according to the first burst, and when the mobile identification code conforms to the predetermined term, the decision-making unit determines whether the mobile identification code is in a blacklist group, and if not, the determination mechanism determines whether the paging message is the dummy paging message according to the first burst.

15. The communication device as claimed in claim 14, wherein, when the mobile identification code conforms to the predetermined term and in the blacklist group, the determination mechanism determines whether the paging message is the dummy paging message according to at least two bursts of the paging message.

16. A control method adapted to a communication device, comprising:
   (a) receiving a first burst of a paging message; and
   (b) comparing a signal-to-noise ratio with a first threshold to generate a comparison result, and deciding a determination mechanism according to the comparison result to determine whether the paging message is a dummy paging message, wherein the signal-to-noise ratio relates to a channel that the first burst travels through and wherein the deciding is achieved without reference to another paging message,
   wherein step (b) comprises reading a mobile identification code of the communication device when the signal-to-noise ratio is lower than the first threshold, and deciding the determination mechanism according to the mobile identification code,
   determining whether the signal-to-noise ratio is higher than a second threshold when the signal-to-noise ratio is lower than the first threshold, the second threshold being lower than the first threshold; and
   when the signal-to-noise ratio is lower than the second threshold, determining whether the paging message is the dummy paging message according to at least two bursts in the paging message.

17. The control method as claimed in claim 16, further comprising:
   when the signal-to-noise ratio is higher than the first threshold, determining whether the paging message is the dummy paging message according to the first burst; and
   when the signal-to-noise ratio is lower than the first threshold, determining whether the paging message is the dummy paging message according to at least two bursts in the paging message.

18. The control method as claimed in claim 16, wherein, step (b) comprises:
   determining whether the mobile identification code is in a blacklist group;
   when the mobile identification code is not in the blacklist group, determining whether the paging message is the dummy paging message according to the first burst; and
   when the mobile identification code is in the blacklist group, determining whether the paging message is the dummy paging message according to at least two bursts in the paging message.

19. The control method as claimed in claim 16, wherein, step (b) comprises:
   determining whether the mobile identification code is in a blacklist group when the signal-to-noise ratio is lower than the first threshold and higher than the second threshold;
   wherein when the mobile identification code is not in the blacklist group, the determination mechanism determines whether the paging message is the dummy paging message according to the first burst; and
   when the mobile identification code is in the blacklist group, determining whether the paging message is the dummy paging message according to at least two bursts in the paging message.

20. The control method as claimed in claim 16, wherein, step (b) comprises:
   determining whether the mobile identification code conforms to a predetermined term when the signal-to-noise ratio is lower than the first threshold and higher than the second threshold; and
   when the mobile identification code does not conform to the predetermined term, determining whether the paging message is the dummy paging message according to the first burst.

21. The control method as claimed in claim 20, wherein, the mobile identification code conforms to the predetermined term when a difference between a part of the mobile identification code and a feature vector of the dummy paging message is less than a default value.

22. The control method as claimed in claim 20, wherein, step (b) comprises:
   determining whether the mobile identification is in a blacklist group when the mobile identification code conforms to the predetermined term;
   when the mobile identification code is not in the blacklist group, determining whether the paging message is the dummy paging message according to the first burst; and
   when the mobile identification code is in the blacklist group, determining whether the paging message is the dummy paging message according to at least two bursts in the paging message.

* * * * *